(12) United States Patent
Xu

(10) Patent No.: US 12,761,538 B2
(45) Date of Patent: Oct. 13, 2026

US012761538B2

(54) HANDHELD CAMERA-STABILIZATION TRIPOD HEAD PROVIDED WITH REMOTE CONTROL ASSEMBLY

(71) Applicant: SHENZHEN YUANSU CHUANGDA TECHNOLOGY CO.,LTD, Shenzhen (CN)

(72) Inventor: Xibin Xu, Shenzhen (CN)

(73) Assignee: SHENZHEN YUANSU CHUANGDA TECHNOLOGY CO., LTD, Shenzhen (CN)

( * ) Notice: Subject to any disclaimer, the term of this patent is extended or adjusted under 35 U.S.C. 154(b) by 147 days.

(21) Appl. No.: 18/929,784

(22) Filed: Oct. 29, 2024

(65) Prior Publication Data

US 2025/0251649 A1 Aug. 7, 2025

(30) Foreign Application Priority Data

Feb. 2, 2024 (CN) ........................ 202420260345.X

(51) Int. Cl.

*G03B 17/56* (2021.01)
*F16M 11/12* (2006.01)
*F16M 11/18* (2006.01)
*F16M 13/04* (2006.01)

(52) U.S. Cl.

CPC ......... *G03B 17/561* (2013.01); *F16M 11/121* (2013.01); *F16M 11/18* (2013.01); *F16M 13/04* (2013.01)

(58) Field of Classification Search

CPC .... G03B 17/56; G03B 17/561; G03B 17/563; G03B 17/566; G03B 2206/00; F16M 11/04; F16M 11/041; F16M 11/121; F16M 11/123; F16M 11/20; F16M 11/2007; F16M 11/2035; F16M 11/2042; F16M 11/205; F16M 13/00; F16M 13/04; F16M 11/18; F16M 11/12; H04N 23/66; H04N 23/695

See application file for complete search history.

(56) References Cited

U.S. PATENT DOCUMENTS

2015/0042830 A1* 2/2015 Reid ...................... F16M 11/28 348/211.7
2017/0064176 A1* 3/2017 Kim ...................... H04N 23/66
2021/0368970 A1* 12/2021 Xu ............................ A45F 5/10

* cited by examiner

*Primary Examiner* — Stephanie E Bloss
*Assistant Examiner* — Fang-Chi Chang
(74) *Attorney, Agent, or Firm* — HOWARD M COHN and Associates, LLC

(57) ABSTRACT

A handheld camera-stabilization tripod head provided with a remote control assembly comprises a tripod head body and a remote control assembly, wherein an assembly area is arranged on an outer wall of the tripod head body, and at least two electrical feeler pins are arranged in the assembly area; the remote control assembly is detachably connected to the assembly area, and electrical contacts matched with the electrical feeler pins are arranged on an outer wall of the remote control assembly; when the electrical feeler pins are connected to the electrical contacts, the tripod head body in an on state arouses the remote control assembly in an off state; or, the remote control assembly in an on state arouses the tripod head body in an off state, such that the handheld camera-stabilization tripod head can be driven to be activated to be quickly used by users.

10 Claims, 6 Drawing Sheets

HANDHELD CAMERA-STABILIZATION TRIPOD HEAD PROVIDED WITH REMOTE CONTROL ASSEMBLY

BACKGROUND OF THE INVENTION

1. Technical Field

The invention relates to the field of camera stabilizers, in particular to a handheld camera-stabilization tripod head provided with a remote control assembly.

2. Description of Related Art

With the continuous improvement in living standards and rapid development of electronic products, mobile phone cameras have an increasingly higher resolution and are widely applied to increasing scenarios in life, and mobile phones become portable tools for recording. To obtain better photography experience, related auxiliary photographic instruments, such as tripods, selfies and camera stabilizers, are often used to assist photography. All these products can be used as needed to satisfy requirements of different customers to expand the application of mobile phones as main photographic instruments.

In the prior art, for the convenience of photographing by users, a recess is formed in a grip portion of many handheld camera stabilization devices, and a remote control switch in communication with a mobile phone is inlaid and assembled in the recess, and users can take the remote control switch out of the recess to remotely control the mobile phone to take photographs according to personal requirements, such that using is flexible. However, it is found in actual use that the remote control switch has only one function and can only control a camera program of the mobile phone, leading to poor user experience; and the remote control switch and a handheld camera stabilization device are not be connected to be started synchronous, and users have to turn on the handheld camera stabilization device and the remote control switch separately, leading to complex operations and making it impossible for users to quickly connect the handheld camera stabilization device and the remote control switch in use. In view of this, a handheld camera stabilization device with a more reasonable structure is urgently needed to solve the above problems.

BRIEF SUMMARY OF THE INVENTION

The objective of the invention is to provide a solution to solve the technical problems that the remote control switch of an existing handheld camera-stabilization tripod head has only one function and cannot be quickly connected to a handheld camera stabilizer to be used.

To fulfill the above objective, the invention provides a handheld camera-stabilization tripod head provided with a remote control assembly, comprising:

a tripod head body, an assembly area being arranged on an outer wall of the tripod head body, and at least two electrical feeler pins being arranged in the assembly area; and a remote control assembly, the remote control assembly being detachably connected to the assembly area, and electrical contacts matched with the electrical feeler pins being arranged on an outer wall of the remote control assembly;

wherein, when the electrical feeler pins are connected to the electrical contacts, the tripod head body in an on state arouses the remote control assembly in an off state; or, the remote control assembly in an on state arouses the tripod head body in an off state.

Wherein, a first chip is arranged in the tripod head body and electrically connected to the electrical feeler pins, and a second chip is arranged in the remote control assembly and electrically connected to the electrical contacts;

when the electrical feeler pins are connected to the electrical contacts, the first chip in an on state arouses the second chip in an off state, such that the remote control assembly is aroused by the tripod head body; or, the second chip in an on state arouses the first chip in an off state, such that the tripod head body is aroused by the remote control assembly.

Wherein, a first switch electrically connected to the first chip is arranged on a surface of the tripod head body, and a second switch electrically connected to the second chip is arranged on a surface of the remote control assembly.

Wherein, a recess is formed in the outer wall of the tripod head body, and a bottom surface of the recess forms the assembly area.

Wherein, when the remote control assembly is received in the recess, the remote control assembly is magnetically attracted to the assembly area.

Wherein, the remote control assembly is provided with a button and/or a joystick; and when the joystick and/or the button is pressed, the second chip generates a control instruction and transmits the control instruction to the first chip, and in response to the control instruction, the first chip adjusts a triaxial structure on the tripod head body.

Wherein, a rotary knob is arranged on the remote control assembly, an end of the rotary knob stretches into the remote control assembly and is provided with a magnet element, and a Hall element matched with the magnet element is arranged in the remote control assembly; and the Hall element is electrically connected to the second chip.

Wherein, a clamping ring groove and a clamping ring disposed around a bottom surface of the clamping ring groove are arranged on a columnar surface of the end, stretching into the remote control assembly, of the rotary knob, and a ring surface of the clamping ring abuts against a wall surface of an inner cavity of the remote control assembly.

Wherein, the tripod head body comprises a grip portion, a triaxial structure and a clamping portion which are connected in sequence; and the recess is located in an outer wall of the grip portion, and a battery module and a first chip are arranged in the grip portion.

Wherein, expansion modules are detachably connected to two opposite ends of the clamping portion.

The invention has the following beneficial effects: compared with the prior art, the invention provides a handheld camera-stabilization tripod head provided with a remote control assembly, comprising: a tripod head body and a remote control assembly, wherein an assembly area is arranged on an outer wall of the tripod head body, and at least two electrical feeler pins are arranged in the assembly area; the remote control assembly is detachably connected to the assembly area, and electrical contacts matched with the electrical feeler pins are arranged on an outer wall of the remote control assembly; when the electrical feeler pins are connected to the electrical contacts, the tripod head body in an on state arouses the remote control assembly in an off state; or, the remote control assembly in an on state arouses the tripod head body in an off state, such that the handheld camera-stabilization tripod head can be driven to be activated so as to be quickly used by users.

REFERENCE SIGNS OF MAIN COMPONENTS

1, tripod head body; 11, grip portion; 12, triaxial structure; 13, clamping portion; 14, expansion module; 15, recess; 111, display module; 2, remote control assembly; 21, second chip; 22, button; 23, joystick; 24, rotary knob; 25, magnet element; 26, Hall element; 27, clamping ring groove; 28, clamping ring; 3, electrical feeler pin; 4, electrical contact; a, first switch; b, second switch.

DETAILED DESCRIPTION OF THE INVENTION

To better clarify the invention, the invention is further described below in conjunction with accompanying drawings.

In the following description, details of generally selected embodiments are provided below to gain a deeper understanding of the invention. Obviously, the embodiments in the following description are merely illustrative ones, and are not all possible ones of the invention. It should be understood that the following specific embodiments are used for explaining the invention rather than limiting the invention.

It should be understood that terms "include" and/or "comprise" used in the description indicates the presence of features, entities, steps, operations, elements or assemblies indicated, not excluding the presence or addition of one or more other features, entities, steps, operations, elements, assemblies or combinations thereof.

Figure 1:
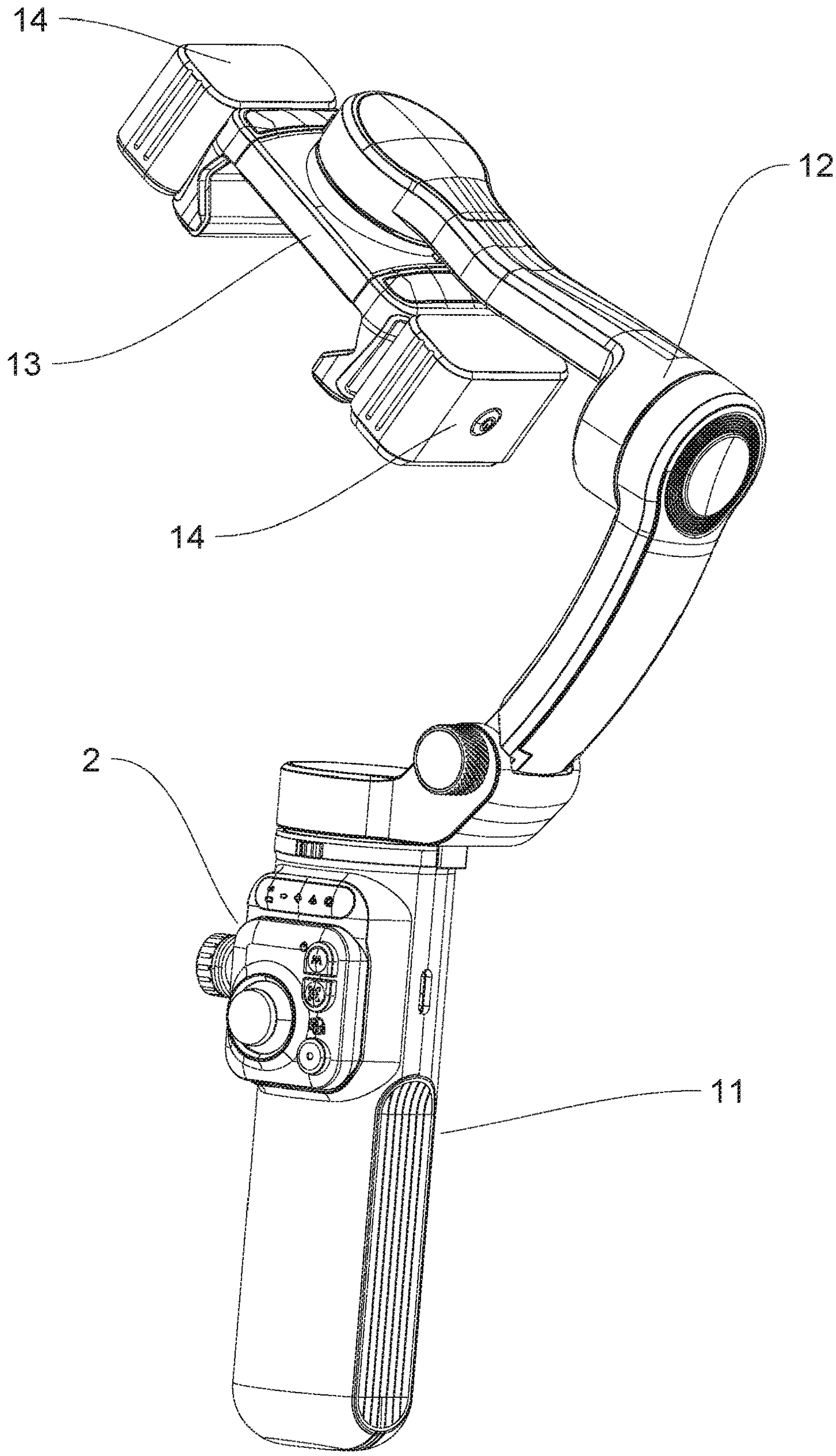
FIG. 1 is a three-dimensional view according to the invention.
Figure 2:
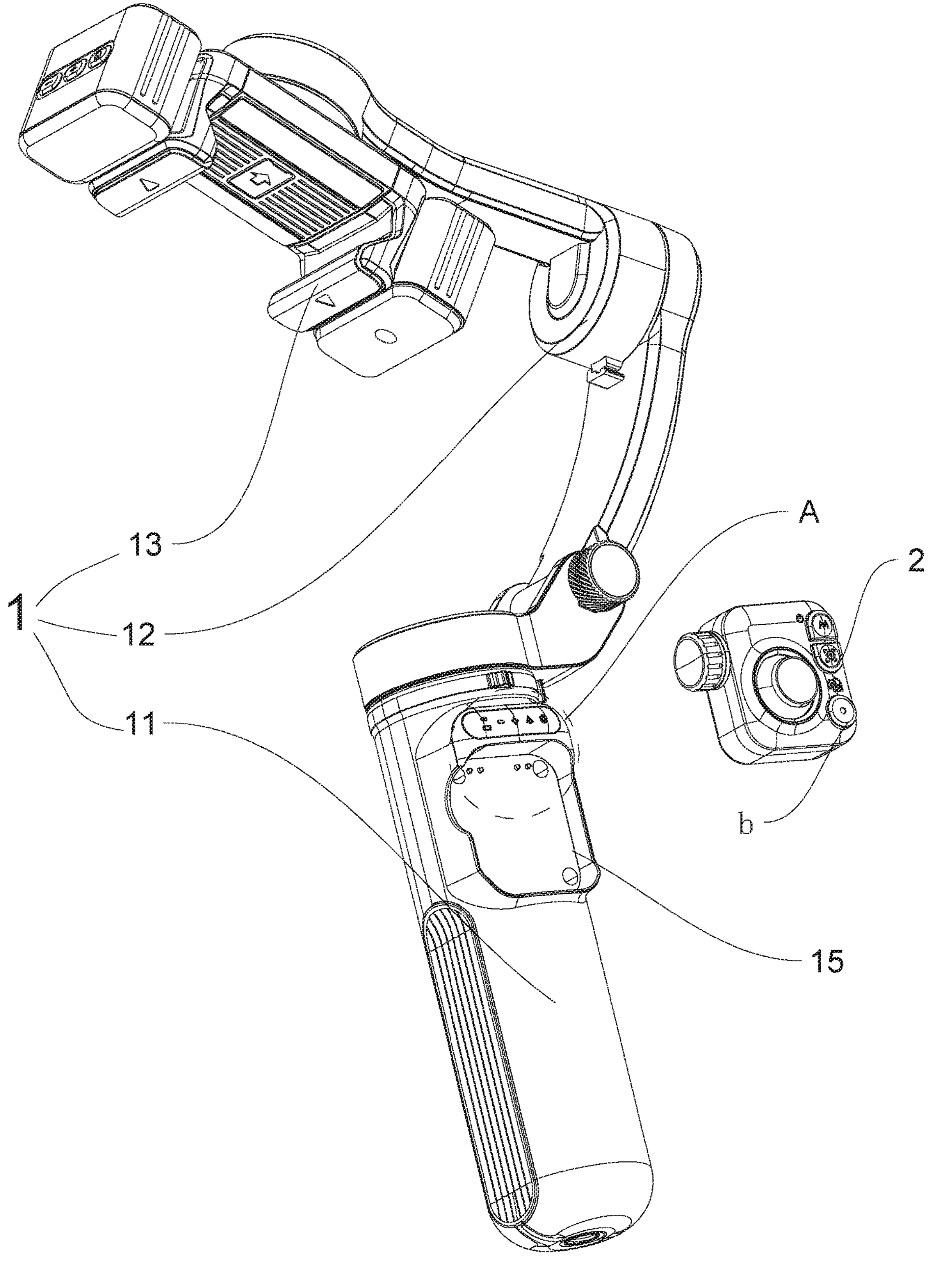
FIG. 2 is an exploded view according to the invention.
Figure 3:
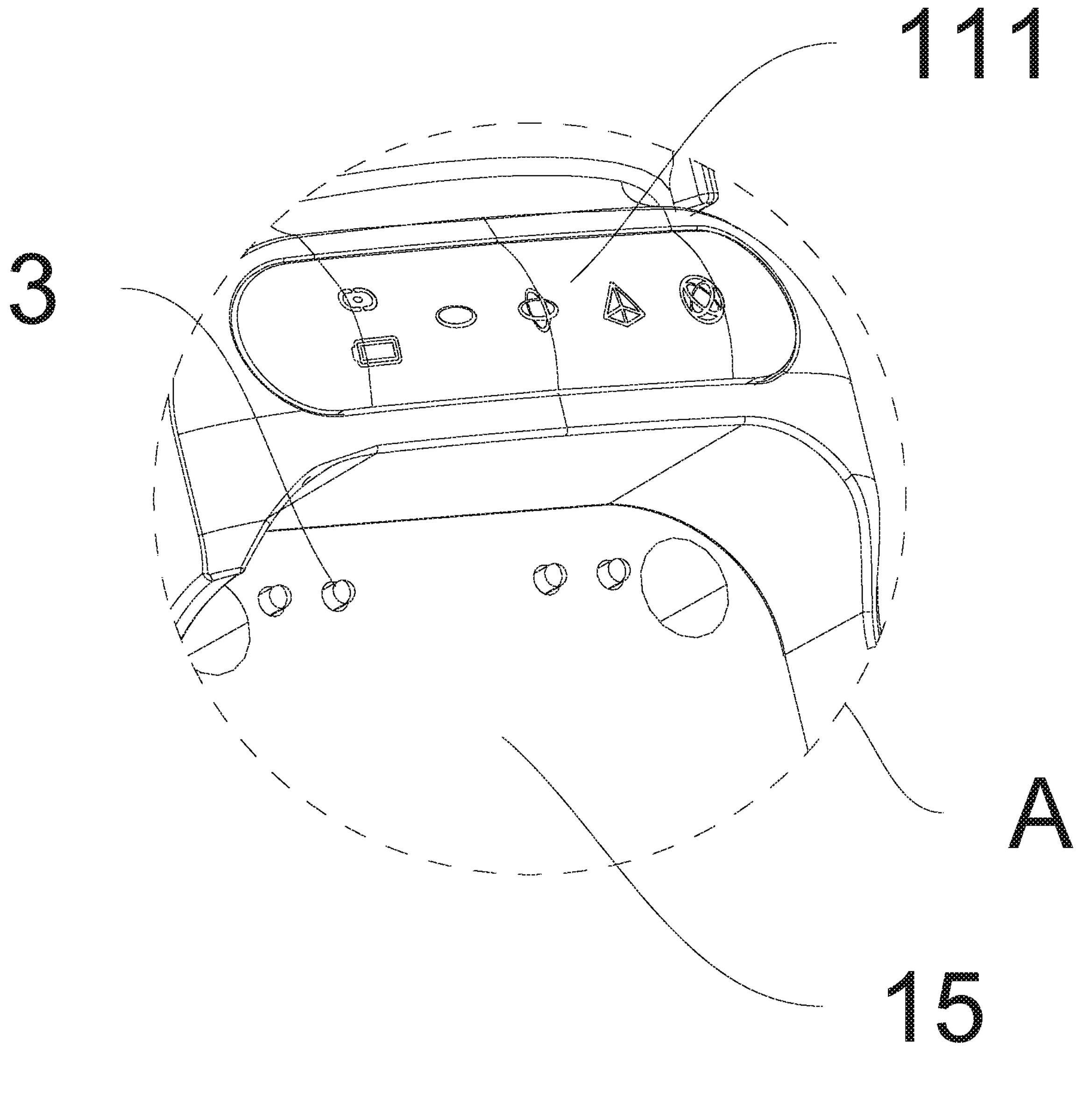
FIG. 3 is an enlarged view of area A in FIG. 2 according to the invention.
Figure 4:
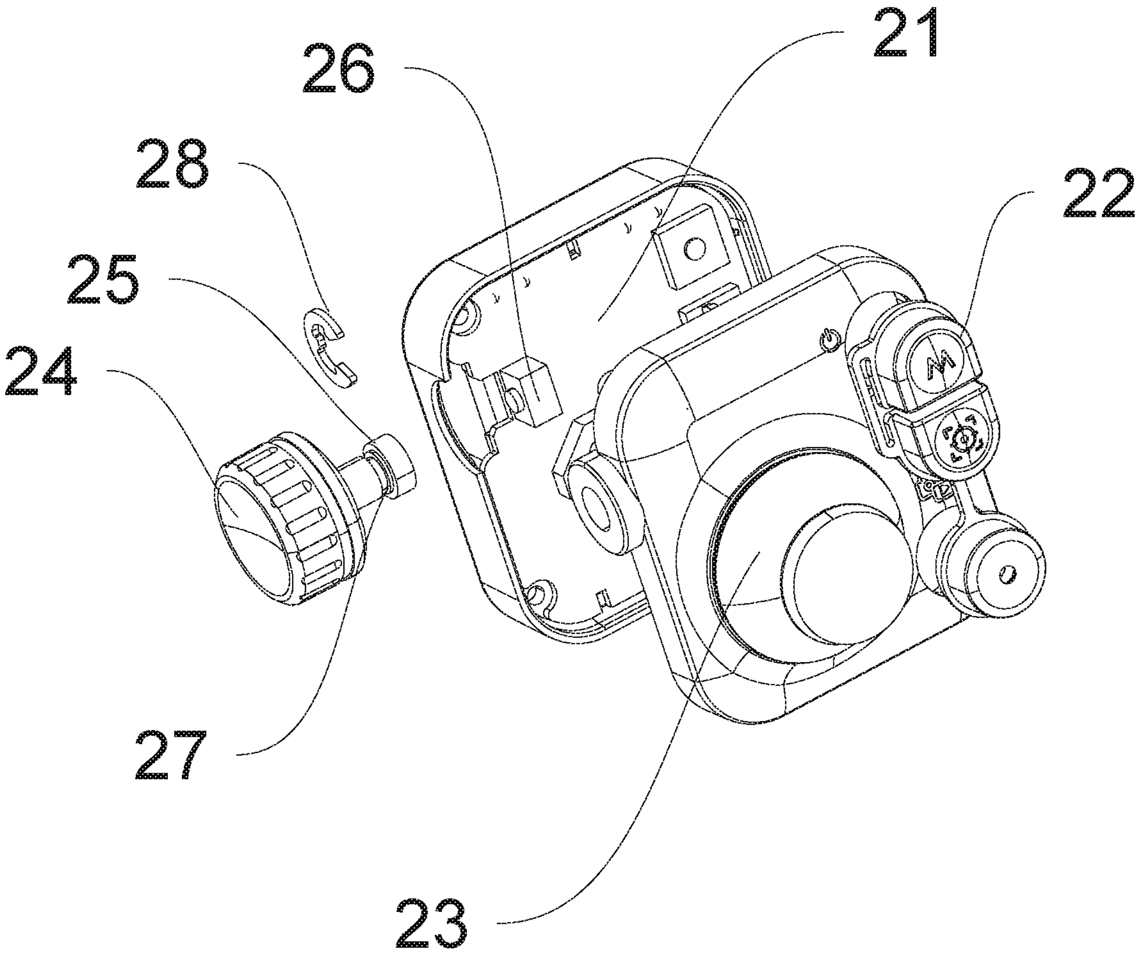
FIG. 4 is an exploded view of a remote control assembly according to the invention.
Figure 5:
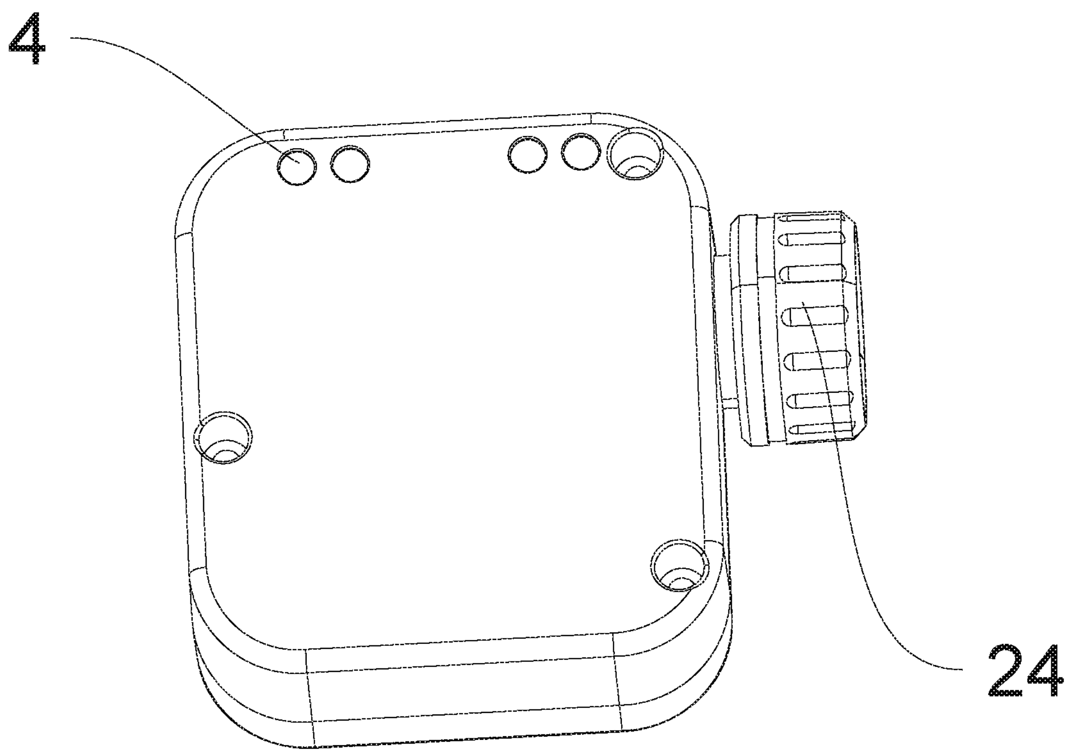
FIG. 5 is a schematic view of the back of the remote control assembly according to the invention.
Figure 6:
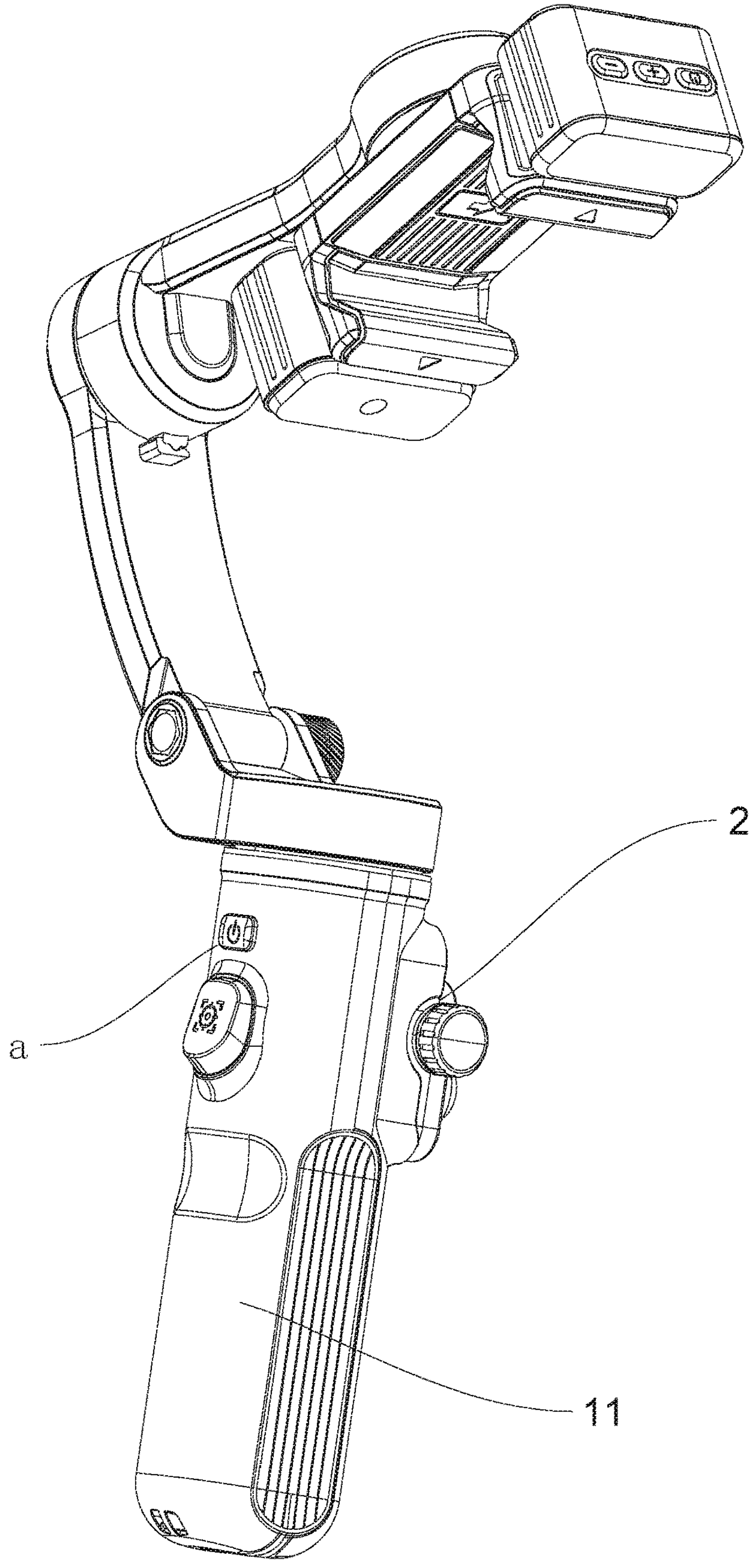
FIG. 6 is a three-dimensional view from another perspective according to the invention.

To solve the abovementioned technical problems, the application provides a handheld camera-stabilization tripod head provided with a remote control assembly. Referring to FIGS. 1-6, the handheld camera-stabilization tripod head provided with a remote control assembly comprises a tripod head body 1 and a remote control assembly 2, wherein an assembly area is arranged on an outer wall of the tripod head body 1, and at least two electrical feeler pins 3 are arranged in the assembly area; the remote control assembly 2 is detachably connected to the assembly area; electrical contacts 4 matched with the electrical feeler pins 3 are arranged on an outer wall of the remote control assembly 2; when the electrical feeler pins 3 are connected to the electrical contacts 4, the tripod head body 1 in an on state arouses the remote control assembly 2 in an off state; or, the remote control assembly 2 in an on state arouses the tripod head body 1 in an off state. To further expound the scheme of the application, two electrical feeler pins 3 and two electrical contacts 4 are arranged, the two electrical feeler pins 3 are respectively referred to as a first electrical feeler pin and a second electrical feeler pin, the two electrical contacts 4 are respectively referred to as a first electrical contact and a second electrical contact, and there are the following four cases according to the on/off state of the remote control assembly and the tripod head body.

First case: the tripod head body 1 is in the on state, and the remote control assembly 2 is in the off state; in this case, when the remote control assembly 2 is assembled in the assembly area, the first electrical feeler pin comes in contact with the first electrical contact to form a first signal channel, the tripod head body 1 transmits a first synchronous on signal to the remote control assembly 2 through the first signal channel, and in response to the first synchronous on signal, the remote control signal 2 will be aroused to switch to the on state, and the handheld camera-stabilization tripod head enters a normal operating state;

Second case: the remote control assembly 2 is in the on state, and the tripod head body 1 is in the off state; in this case, when the remote control assembly 2 is assembled in the assembly area, the second electrical feeler pin comes in contact with the second electrical contact to form a second signal channel, the remote control assembly 2 transmits a second synchronous on signal to the tripod head body 1 through the second signal channel, and in response to the second synchronous on signal, the tripod head body 1 will be aroused to switch to the on state, and the handheld camera-stabilization tripod head enters a normal operating state;

Third case: the remote control assembly 2 is in the on state, and the tripod head body 1 is also in the on state; in this case, the handheld camera-stabilization tripod head enters a normal operating state, the remote control assembly 2 wirelessly communicates with the tripod head body 1, the remote control assembly 2 may be assembled in the assembly area to control the tripod head body, or the tripod head body 1 may be separated out to be controlled wirelessly.

Fourth case: the remote control assembly 2 and the tripod head body 1 are both in the off state, and the handheld camera-stabilization tripod head waits to be turned on to be used by users; in this case, after any one of the remote control assembly 2 and the tripod head body 1 is turned on, the subsequent operations will be the same as those in the first case and the second case; when the remote control assembly 2 and the tripod head body are both in the on state, the operations will be the same as those in the third case.

Obviously, in this scheme, when any one of the tripod head body 1 and the remote control assembly 2 is in the on state, the handheld camera-stabilization tripod head will be driven to be activated so as to be quickly used by users. As for the electrical feeler pins 3 and the electrical contacts 4, four electrical contacts 4 and fourth electrical feeler pins 3 may be arranged, wherein two electrical feeler pins 3 and two electrical contacts 4 form the first signal channel and the second signal channel, and the other two electrical feeler pins 3 and the other two electrical contacts 4 are used for supplying and receiving power, that is, power is transmitted from a power supply module in the tripod head body 1 to the remote control assembly 2 to charge a battery in the remote control assembly 2. In this way, the remote control assembly 2 does not need to be provided with a charging port anymore, thus further reducing the cost.

In a specific scheme, a first chip is arranged in the tripod head body 1 and electrically connected to the electrical feeler pins 3, and a second chip 21 is arranged in the remote control assembly 2 and electrically connected to the electrical contacts 4. When the electrical feeler pins 3 and the electrical contacts 4 are connected, the first chip in an on state arouses the second chip 21 in an off state, such that the remote control assembly 2 is aroused by the tripod head body 1; or, the second chip 21 in an on state arouses the first chip in an off state, such that the tripod head body 1 is aroused by the remote control assembly 3. That is to say, the process of arousing the remote control assembly 2 by the tripod head body 1 is the process of arousing the second chip 21 by the first chip, and the process of arousing the tripod head body 1 by the remote control assembly 2 is the process of arousing the first chip by the second chip 21. When the first chip and the second chip 21 are both in the on state, the first chip and the second chip 21 communicate with each other to form a wireless communication connection, an entry key on the remote control assembly 2 is pressed and controlled to enable the second chip 21 to generate a corresponding control signal, which is transmitted to the first chip, and in response to the control signal, the first chip controls the tripod head body 1, for example, to enter a preset mode, a switching mode or a partial pivoting compensation mode. The first chip may be, but not limited to, an AT32F413 chip, and the second chip 21 may be, but not limited to, a YC10X chip.

In this scheme, a first switch a electrically connected to the first chip is arranged on a surface of the tripod head body 1, and a second switch b electrically connected to the second chip 21 is arranged on a surface of the remote control assembly. It can be easily understood that the first switch a and the second switch b control on/off of the first chip and the second chip 21 correspondingly and separately. Specifically, when the first switch a is pressed, a circuit of the first chip is turned on, a program loaded in the first chip runs, and correspondingly, the tripod head body 1 is turned on. Similarly, when the second switch b is pressed, a circuit of the second chip 21 is turned on, a program loaded in the second chip 21 runs, and correspondingly, the remote control assembly 2 is turned on.

The remote control assembly 2 may be detachably mounted in the assembly area by means of a buckle structure or a plug-in structure. To ensure that the tripod head body 1 and the remote control assembly can be detached more reasonably, in this embodiment, a recess 15 is formed in the outer wall of the tripod head body 1, and a bottom surface of the recess 15 forms the assembly area; after the remote control assembly 2 is placed in the recess 15, an outer side of the remote control assembly 2 is partially or entirely enclosed by a side wall of the recess 15, such that the assembly stability of the remote control assembly 2 in the assembly area is remarkably improved. In a preferred scheme, when the remote control assembly 2 is received in the recess 15, the remote control assembly 2 is magnetically attracted to the assembly area by means of the following structure: a first magnet unit is arranged on the remote control assembly 2, a second magnet unit is arranged at a position, corresponding to the assembly area, of a shell profile of the tripod head body 1, and the remote control assembly 2 is magnetically attracted to the assembly area by means of the first magnet unit and the second magnet unit, such that the assembly stability of the remote control assembly is further improved.

In this embodiment, the remote control assembly 2 is provided with a button 22 and/or a joystick 23; when the button 22 and/or the joystick 23 is pressed, the second chip 21 generates a control instruction and transmits the control instruction to the first chip, and in response to the control instruction, the first chip controls a parameter of a triaxial structure of the tripod head body 1. Wireless transmission or wired transmission may be adopted for signal transmission, wherein the wireless transmission may be realized by means of the first chip and the second chip 21 that have a wireless communication function; and in a case where the wired communication is adopted, an electrical feeler pin and an electrical contact that have a data transmission function may be arranged correspondingly, and the electrical feeler pin comes in physical contact with the electrical contact to realize signal transmission. The triaxial structure of the tripod head body 1 may be a movable component formed by three pivot axis structures, which are respectively a pitch axis structure, a roll axis structure and a yaw axis structure, and the triaxial structure is provided with adjustment motors corresponding to the three moving axes respectively. When the joystick 23 is squeezed or shaken and/or the button 21 is pressed, the second chip 21 generates a control instruction, and in response to the control instruction, the first chip controls the operating state of the corresponding motor (that is, the corresponding parameter of the movable component is adjusted) to adjust the position and posture a photographic terminal so as to realize stable photography, auxiliary camera movement, or other effects. In the application, the photographic terminal is a camera, a mobile phone, a tablet computer, or other electronic devices with a camera function.

In this embodiment, a rotary knob 24 is arranged on the remote control assembly 2, one end of the rotary knob 24 elastically stretches into the remote control assembly 2 and is provided with a magnet element 25, and a Hall element 16 matched with the magnet element 25 is arranged in the remote control assembly 2; and the Hall element 16 is electrically connected to the second chip 21. By means of the rotary knob 24, adjustment can be performed more easily, for example, users can rotate the rotary knob 24 to realize zoom control and depth-of-field (DOF) control of a photographic terminal and can press the rotary knob to realize switching between a DOF mode and a zoom mode. In regard to assembly of the rotary knob 24, a clamping ring groove 27 and a clamping ring 28 disposed around a bottom surface of the clamping ring groove 27 are arranged in a columnar surface of the end, stretching into the remote control assembly 2, of the rotary knob 24, and a ring surface of the clamping ring 28 abuts against a wall surface of an inner cavity of the remote control assembly 2. The clamping ring groove 27 and the clamping ring 28 work together to prevent the rotary knob from disengaging from the shell profile of the remote control assembly, thus improving the operating stability of the rotary knob.

In this embodiment, the tripod head body comprises a grip portion 11, a triaxial structure 12 and a clamping portion 13 which are connected in sequence; the recess is located in an outer wall of the grip portion 11, and a battery module and a first chip are arranged in the grip portion 11. The grip portion 11 can be well held by users, the triaxial structure 12 is used for connecting the clamping portion 13 and the grip portion 11, and the clamping portion 13 is used for stably clamping a photographic terminal, which may be a mobile phone with a suitable size, a tablet computer with a suitable size, or other electronic devices with a cameral function and a suitable size. The battery module and the first chip are received in the grip portion 11, and the first chip is electrically connected to motors in the triaxial structure to control the triaxial structure. By adopting such a structure, the weight distribution of the tripod head body is more reasonable, thus improving the grip experience of users.

In this embodiment, a display module 111 is arranged on an outer wall of the grip portion 11 and electrically connected to the first chip, and icons corresponding to different operating modes are formed on the display module 111. By means of the icons formed on the display module 111, users can quickly know the operating mode of the handheld camera-stabilization tripod head and power consumption of the battery module.

In this embodiment, expansion modules 14 are detachably connected to two opposite ends of the clamping portion 13. The expansion modules 14 may comprise a fill light module, an infrared tracking module, a microphone module and the like to satisfy various requirements for photographic scenarios. In case of a dark environment, the fill light module can be used to supplement light for a photographed object. In a case where a sound pick-up device with a better sound pick-up quality is needed when a VOLG is recorded, the microphone module may be used to pick up sounds to help users complete a photographing task or record their lives.

The invention has the following advantages:

When any one of the tripod head body and the remote control assembly is in the on state, the handheld camera-stabilization tripod head can be driven to be activated so as to be quickly used by users.

Several specific embodiments of the invention are disclosed above, and the invention is not limited to the above embodiments. Any variations that can be obtained by those skilled in the art should fall within the protection scope of the invention.

What is claimed is:

1. A handheld camera-stabilization tripod head provided with a remote control assembly, comprising:

a tripod head body, an assembly area being arranged on an outer wall of the tripod head body, and at least two electrical feeler pins being arranged in the assembly area; and a remote control assembly, the remote control assembly being detachably connected to the assembly area, and electrical contacts matched with the electrical feeler pins being arranged on an outer wall of the remote control assembly;

wherein, when the electrical feeler pins are connected to the electrical contacts, the tripod head body in an on state arouses the remote control assembly in an off state; or, the remote control assembly in an on state arouses the tripod head body in an off state.

2. The handheld camera-stabilization tripod head provided with a remote control assembly according to claim 1, wherein a first chip is arranged in the tripod head body and electrically connected to the electrical feeler pins, and a second chip is arranged in the remote control assembly and electrically connected to the electrical contacts;

when the electrical feeler pins are connected to the electrical contacts, the first chip in an on state arouses the second chip in an off state, such that the remote control assembly is aroused by the tripod head body; or, the second chip in an on state arouses the first chip in an off state, such that the tripod head body is aroused by the remote control assembly.

3. The handheld camera-stabilization tripod head provided with a remote control assembly according to claim 2, wherein a first switch electrically connected to the first chip is arranged on a surface of the tripod head body, and a second switch electrically connected to the second chip is arranged on a surface of the remote control assembly.

4. The handheld camera-stabilization tripod head provided with a remote control assembly according to claim 2, wherein the remote control assembly is provided with a button and/or a joystick; and when the joystick and/or the button is pressed, the second chip generates a control instruction and transmits the control instruction to the first chip, and in response to the control instruction, the first chip adjusts a triaxial structure on the tripod head body.

5. The handheld camera-stabilization tripod head provided with a remote control assembly according to claim 4, wherein a rotary knob is arranged on the remote control assembly, an end of the rotary knob stretches into the remote control assembly and is provided with a magnet element, and a Hall element matched with the magnet element is arranged in the remote control assembly; and the Hall element is electrically connected to the second chip.

6. The handheld camera-stabilization tripod head provided with a remote control assembly according to claim 5, wherein a clamping ring groove and a clamping ring disposed around a bottom surface of the clamping ring groove are arranged on a columnar surface of the end, stretching into the remote control assembly, of the rotary knob, and a ring surface of the clamping ring abuts against a wall surface of an inner cavity of the remote control assembly.

7. The handheld camera-stabilization tripod head provided with a remote control assembly according to claim 1, wherein a recess is formed in the outer wall of the tripod head body, and a bottom surface of the recess forms the assembly area.

8. The handheld camera-stabilization tripod head provided with a remote control assembly according to claim 7, wherein when the remote control assembly is received in the recess, the remote control assembly is magnetically attracted to the assembly area.

9. The handheld camera-stabilization tripod head provided with a remote control assembly according to claim 7, wherein the tripod head body comprises a grip portion, a triaxial structure and a clamping portion which are connected in sequence; and the recess is located in an outer wall of the grip portion, and a battery module and a first chip are arranged in the grip portion.

10. The handheld camera-stabilization tripod head provided with a remote control assembly according to claim 9, wherein expansion modules are detachably connected to two opposite ends of the clamping portion.

* * * * *